Patented June 26, 1928.

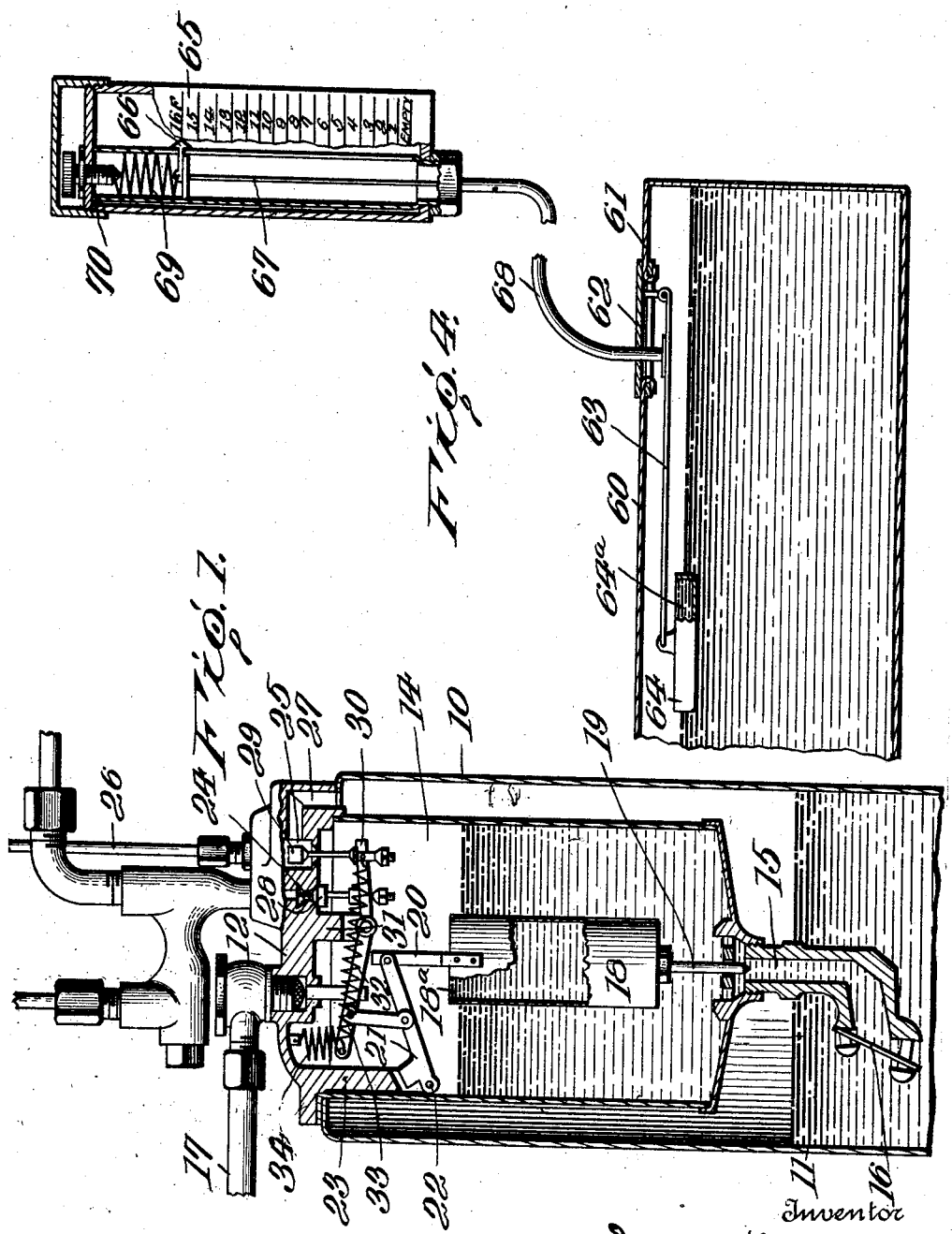

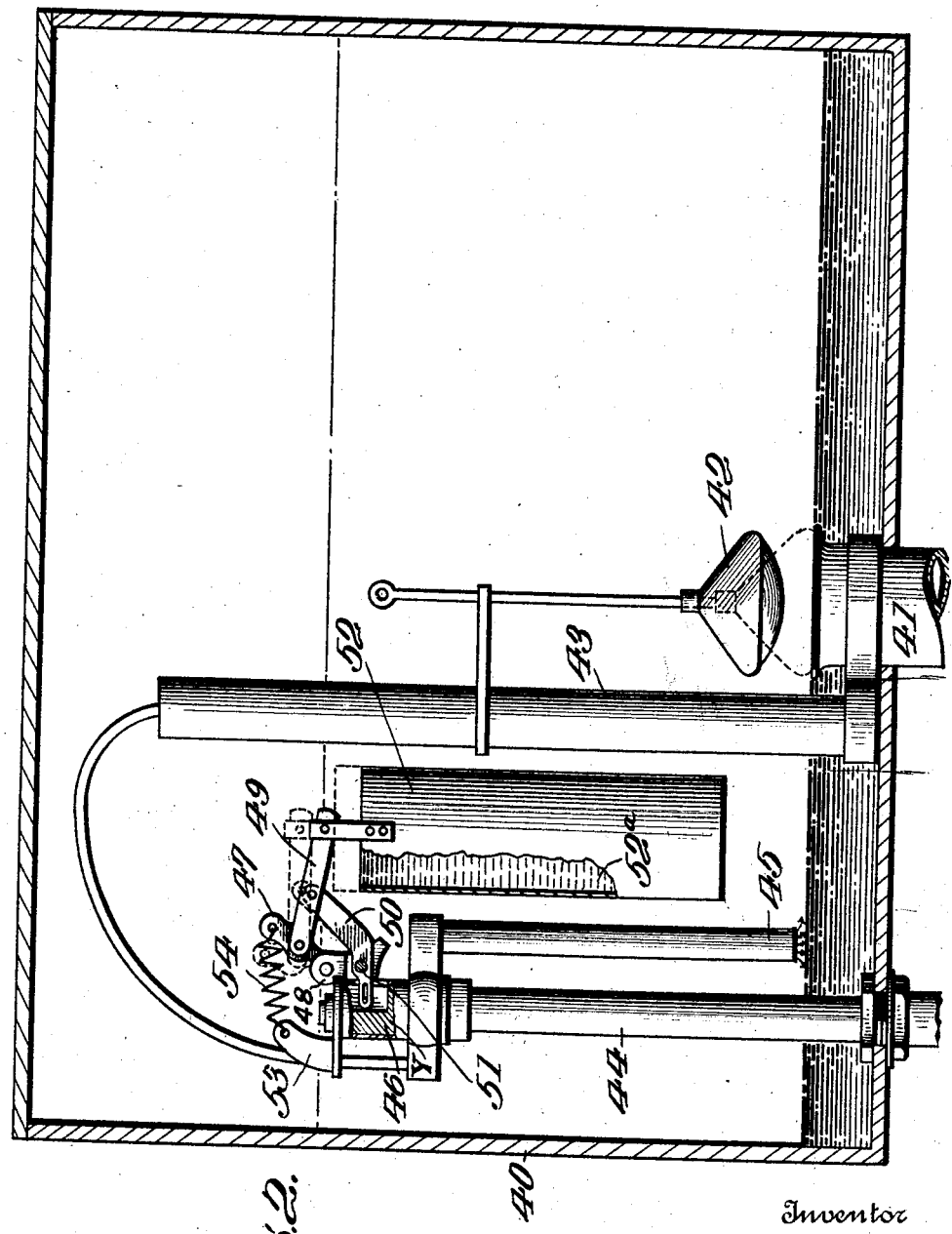

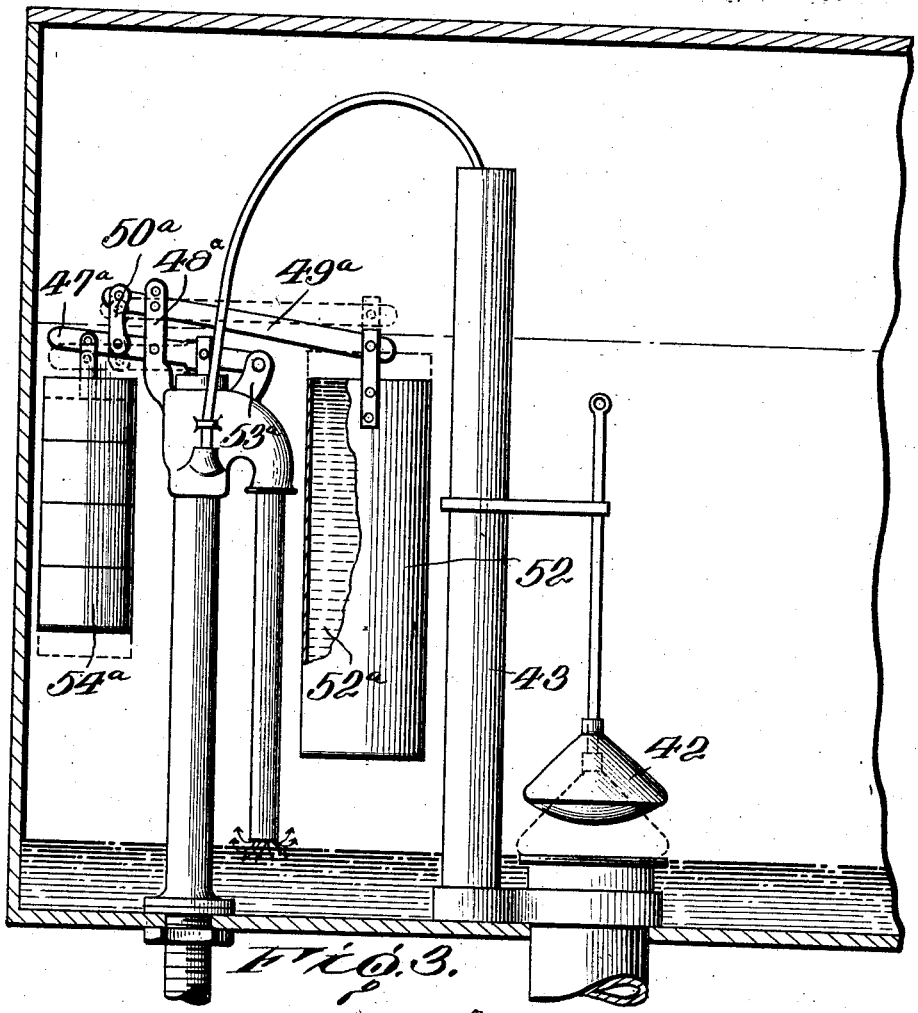
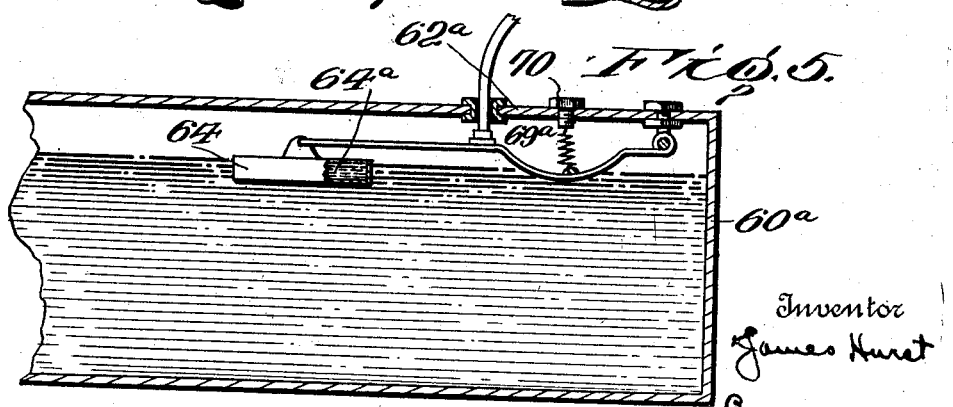

1,675,270

UNITED STATES PATENT OFFICE.

JAMES HURST, OF SAN FRANCISCO, CALIFORNIA.

CONTROL DEVICE.

Application filed July 25, 1922. Serial No. 577,343.

This invention is a device by means of which a valve, an indicator, or other movable element may have movement imparted thereto.

One of the objects of the invention is to provide means for overcoming annoyances incident to the loss of buoyancy of floats now in common use in flush tanks, storage tanks, and the like, by providing a controlling actuator, the operation of which is solely dependent upon its loss of weight, as it becomes wholly or partially submerged in the liquid with which it is associated. A further object is to provide an actuator of the type mentioned, and a valve indicator, or other movable element, so connected therewith, that the parts will be caused to function in response to any movement of the actuator, due to variations in its effective weight, brought about by the extent of its submergence within the liquid in which it is operating. A further object is to provide means to insure that the actuator has approximately the same specific gravity as the liquid in which it is to be submerged.

The invention will be hereinafter fully set forth and particularly pointed out in the claims.

In the accompanying drawing:—

Figure 1 is a longitudinal sectional view illustrating a liquid level maintaining device, of the type associated with the well-known vacuum fuel feed systems for motor vehicles. Figure 2 is a similar view illustrating the invention applied to a water closet flushing tank. Figure 3 is a sectional view illustrating a slight modification of Figure 2. Figures 4 and 5 are sectional views illustrating modifications of the invention, applied to liquid level indicating devices.

Referring to Figure 1 of the drawing, 10 designates a casing, the lower part of which serves as a reservoir for liquid, as indicated at 11. Suspended from the cover 12 of the casing 10, and depending into the latter is a float chamber 14, which is provided with an outlet pipe 15, discharging into the reservoir 11, the flow into said reservoir being controlled by a flapper valve 16.

Liquid is supplied to the float chamber 14, from any desired source, through an opening in the cover 12, connected with a pipe 17. Located within the chamber 14 is a semi-buoyant actuator, which consists of a cup-like receptacle 18, filled with liquid 18$^a$ of approximately the same specific gravity as the liquid within the chamber 14. Preferably it is filled with the same liquid. Said actuator is provided with a guide stem 19 leading down into the outlet pipe 15. The upper end of the actuator 18 is provided with an arm or bail 20, which is pivotally connected to a lever 21, which in turn is pivotally supported at 22, from a depending portion 23 of the cover 12. The air within the float chamber 14 is exhausted through an opening 24 in the cover 12, which may be directly connected with the manifold of the engine, or the like. Or it may also be connected to a suitable pump, not shown, in a manner well-understood in the automobile art. The float chamber is vented through an opening 25 in the cover 12, which leads to a vent pipe 26, and the casing 10 is also vented through an opening 27 leading to the pipe 26.

The suction opening 24 and vent opening 25 are controlled by valves 28 and 29 respectively, carried by a lever 30, pivotally supported by a depending part 31 of the cover 12. A second lever 32 is pivoted to the extension 31, at the same point of connection as the lever 30, and the free ends of said levers are connected by the spring 33, so as to provide for a quick movement of said levers when the ends have passed the dead center. To the other end of the lever 23 is connected one end of a control spring 34, the other end of which is secured to the cover 12.

In practice the actuator 18 is filled with the liquid 18' of approximately the same specific gravity as the liquid contained within the chamber 14. In other words, the actuator has practically no buoyancy with respect to said liquid. In operation, assuming the float chamber and the levers 30 and 32 to be in the positions shown in Figure 1, when the liquid level starts to lower, the weight of the actuator 18 is exerted upon the lever 21, drawing down the end of lever 32, and tensioning the spring 34. This downward movement continues until the lever 32 passes the dead center, whereupon valves 28 and 29 are operated to close the vent 25 and to open the suction 24. The vacuum apparatus will then function to deliver liquid into the float chamber in the pipe 17. As the liquid level rises within the chamber 14, the actuator 18 becomes submerged to the extent that it exerts little or no pressure upon the lever 21, and offers no resistance to its movement. In other words, said lever is relieved of the weight of the actuator, as the latter becomes wholly or partially submerged, it becomes more and more responsive to the counterbalancing spring 34. As the liquid level rises, the spring 34 gradually draws upon the lever 32, until the actuator reaches its highest position, and the free end of said lever passes the dead center, whereupon the spring 33, actuates the lever 30 so as to shut the suction valve 28, and to open the vent valve 29, as shown in Figure 1. The operation of this device is more clearly described in a copending application, Serial No. 491,711, filed August 12, 1921, in which a specifically different form of actuator of the same generic type is disclosed and claimed.

In Figure 2 the invention is illustrated as applied to a flush tank for lavatories, water closets, and the like. Referring to said figure, 40 designates a tank or reservoir which may be of any desired size, shape or style provided with a flush pipe 41. The inlet end of the flush pipe is normally closed by a plug valve 42, which may be unseated or lifted by any suitable means, such as a chain or lever (not shown), in a manner well-understood in the art. The usual overflow pipe 43, connected with a flush pipe 41 and by-passing the valve 42, is employed.

The water or other liquid is delivered through a supply pipe 44, having a discharge branch 45. The valve controlling the flow through said pipe is located within a casting 46, joining the supply pipe and the discharge branch. The valve is not illustrated in detail, because any desired form of valve may be employed. A movable arm 50 is pivoted at 51 to a bracket 48 on the valve casing 46 in a manner to have one end projected into the casing to engage and operate the valve (not shown). The other end of said arm is pivotally connected to a lever 49, which is pivotally connected to a link 47, also pivotally connected to the bracket 48. The free end of lever 49 has suspended therefrom, a receptacle 52, filled with liquid 52ª of approximately the same specific gravity as the liquid flowing into the tank. It is preferred to fill the receptacle 52 with the same liquid as that flowing through pipe 44 into the tank. The free end of the link 47 is connected with a rigid finger 53, by a counterbalancing spring 54, as shown.

In operation, assuming the parts to be in the positions illustrated in full lines Figure 2, the tank has been emptied and the valve has been unseated by the drop of the actuator 52. Liquid is therefore flowing into the tank. As the liquid level rises within the tank the actuator 52 becomes submerged. As water continues to flow into the tank, a point will eventually be reached when the actuator will no longer exert pressure upon the valve through the link 47 and lever 50. The instant that this takes place, the counterbalancing spring 54 is strong enough to bring the actuator to the dotted line position, quickly seating the valve and holding it seated, until the weight of the actuator again overcomes the tension of the spring following an emptying of the tank.

In lieu of the spring 54, the construction illustrated in Figure 3 may be employed. Referring to the last mentioned figure, the actuator 52 is suspended from a lever 49ª, which is pivotally mounted in a bracket 48ª, and provided with an extension connected by means of a link 50ª, with an arm 47ª, pivoted to a rigid finger 53ª, and from which is suspended a weight 54ª. The operation is identical with that described in connection with Figure 2, except that the counterbalancing weight 54ª is utilized instead of a counterbalancing spring 54.

In Figure 4 the invention is illustrated as applied to a liquid level indicating device. In this form of the invention a tank 60 is employed, provided with the usual filling opening 61, closed by a proper cap 62. An arm 63 is pivotally connected at one end to said cap, the other end of said arm being connected to a cup-like actuator 64 which contains liquid 64ª of approximately the same specific gravity as the liquid within the tank 60, preferably the same liquid. At any convenient location, spaced from the tank 10, is the indicator scale 65, and a movable pointer 66, connected by a flexible wire 67 with the lever 63, said wire extending through a suitable conduit 68. To the upper end of the wire 67 is connected a counterbalancing spring 69, which is anchored to an adjusting screw 70.

In operation, the normally high level of the liquid is indicated in Figure 4. As the liquid flows out, the actuator 64 drops by gravity, and moves the pointer 66 correspondingly, at the same time exerting a tension upon the spring 69. When the tank is refilled, a point will be reached when the weight of the actuator will be neutralized by the liquid flowing into the tank, thereby permitting the counterbalancing spring 69 to bring the actuator to its normal position illustrated in Figure 4.

In Figure 5 is illustrated a slight modification of the device illustrated in Figure 4, consisting in connecting the spring 69ª to a screw 70ª mounted in the filling cap 62ª, of the tank 60ª.

The advantages of the invention will be readily apparent to those skilled in the art to which it belongs. It will be particularly noted that by means thereof annoyances incident to the loss of buoyancy of floats now in common use are avoided, and the device is equally useful either for controlling the level of liquid in the tank or receptacle or for indicating said level or both. By constructing the float in the form of a receptacle which may contain the same liquid as that which is placed in the tank, it is possible to insure that the actuator will have approximately the same specific gravity as the liquid in which it operates.

Having thus explained the nature of the invention and described an operative manner of constructing and using the same, although without attempting to set forth all of the forms in which it may be made, or all of the forms of its use, what is claimed is:—

1. A control device of the character described comprising a tank, a movably mounted valve lever, a valve operated thereby, a movably supported actuator lever connected to said valve lever, a receptacle-like actuator movably connected with one end of said actuator lever, and counterbalancing means supported independently of said actuator lever and connected therewith independently of said valve, said actuator being normally filled with liquid of approximately the same specific gravity as the liquid supplied to the tank, whereby the actuator will tend to submerge itself in the liquid within said tank, said counterbalancing means possessing sufficient power to lift the actuator while the weight of the latter is neutralized by submergence.

2. A control device of the character described comprising a tank, a movably mounted valve lever, a valve operated thereby, a movably supported actuator lever pivoted to said valve lever, a receptacle-like actuator member movably connected with one end of said actuator lever, and counterbalancing means supported independently of said actuator lever and connected with the other end thereof independently of said valve, said actuator being normally filled with liquid of approximately the same specific gravity as the liquid supplied to the tank, so that the actuator will tend to submerge itself in the liquid within said tank, said counterbalance means possessing sufficient power to lift the actuator while the weight of the latter is neutralized by submergence.

3. A control device of the character described comprising a tank, a movably mounted valve lever, a valve operated thereby, a movably supported actuator lever pivoted to said valve lever, a receptacle-like actuator movably connected with one end of said actuator lever, a movably mounted counterbalance member supported independently of said actuator lever and movably connected therewith independently of said valve, and a counterbalance spring engaging said counterbalance member.

4. A control device of the character described comprising a tank, a liquid supply pipe discharging thereinto, a valve controlling flow of liquid through said pipe, a receptacle-like actuator normally filled with liquid of approximately the same specific gravity as that which flows through said pipe, a movable valve actuating lever pivotally connected to the valve and to said pipe, a lever movably supported by said pipe, said last mentioned lever being connected at one end to the actuator and at an intermediate point to the valve actuating lever, a counterbalancing spring having one end anchored to said pipe, and means connecting the other end of said spring with an end of said valve actuating lever.

In testimony whereof I have hereunto set my hand.

JAMES HURST.